(12) United States Patent
Sethi et al.

(10) Patent No.: US 11,386,206 B2
(45) Date of Patent: Jul. 12, 2022

(54) ALERTING UNUSUAL ACTIVITIES IN AN ENTERPRISE PRODUCTION ENVIRONMENT

(71) Applicant: Dell Products L.P., Round Rock, TX (US)

(72) Inventors: Parminder Singh Sethi, Ludhiana (IN); Kanika Kapish, Muzaffarnagar (IN); Anay Kishore, Muzaffarpur (IN); Kunal Visoulia, Noida (IN)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 17/026,688

(22) Filed: Sep. 21, 2020

(65) Prior Publication Data

US 2022/0092182 A1 Mar. 24, 2022

(51) Int. Cl.
*G06F 21/00* (2013.01)
*G06F 21/56* (2013.01)
*G06F 21/54* (2013.01)
*G06F 21/55* (2013.01)
*G06F 40/289* (2020.01)

(52) U.S. Cl.
CPC ............ *G06F 21/565* (2013.01); *G06F 21/54* (2013.01); *G06F 21/554* (2013.01); *G06F 40/289* (2020.01)

(58) Field of Classification Search
CPC ...... G06F 21/554; G06F 21/54; G06F 40/289; G06F 21/565
USPC .......................................................... 726/24
See application file for complete search history.

(56) References Cited

U.S. PATENT DOCUMENTS

| 10,986,121 B2* | 4/2021 | Stockdale | ............... H04L 43/12 |
| 2020/0042700 A1* | 2/2020 | Li | ......................... G06F 21/554 |
| 2021/0406365 A1* | 12/2021 | Neil | ....................... G06F 21/566 |
| 2022/0030010 A1* | 1/2022 | Shah | ................... H04L 63/1425 |

\* cited by examiner

*Primary Examiner* — Josnel Jeudy
(74) *Attorney, Agent, or Firm* — Daly, Crowley Mofford & Durkee, LLP

(57) ABSTRACT

A system and method model activities in the production environment as sequences of microservices, and identify unusual activities by analyzing these sequences. In particular, a directed graph of usual activity is formed as a basis for determining unusual activities. Next, activities that were actually performed are determined by statistically analyzing records of microservice invocation in application diagnostic files. These activity sequences are overlaid on the directed graph to determine relative fit by using a trace coverage percentage score. Application instances or activities with low relative fit are deemed suspicious. If the low fit persists for an extended duration, then the instances or activities are deemed unusual and an individual is alerted to begin a manual review.

18 Claims, 8 Drawing Sheets

ALERTING UNUSUAL ACTIVITIES IN AN ENTERPRISE PRODUCTION ENVIRONMENT

FIELD

The disclosure pertains generally to error detection and correction in electrical digital data systems, and more particularly to evaluating the performance of an enterprise production environment by modeling and statistical analysis.

BACKGROUND

The systems development life cycle (SDLC) is a process for engineering an information system. Its concepts apply to hardware, software, or a combination of both hardware and software. In a typical formulation, the SDLC includes six stages: system requirements gathering and analysis, design, development, testing, deployment, and maintenance.

In the SDLC context, an "environment" is a controlled information subsystem in which various stages can be implemented without affecting the other stages. Environments may be created for a variety of reasons, including to isolate data input by system developers for testing purposes from "live" data input by end users. Common environments include: a development environment for debugging errors in an "alpha" stage, a build environment for merging contributions from different developers into a single software application or system, a systems integration environment for running tests to ensure that contributions from different developers operate together without error, a user acceptance testing ("UAT") environment for obtaining the input and feedback of early users in a "beta" stage, and a production environment that is exposed to end users.

Business decisions, such as how to market a product or how to provide future product enhancements, often are based on analysis of data in the production environment. Thus, it is critical that these data are accurate and based primarily on actual customer inputs. In some cases, testing of the production environment is necessary, and "dummy" application instances (copies) may be deployed and use test data, such as fake email addresses, telephone numbers, or other testing data. Ordinarily, these dummy instances are registered with a database, and their data are filtered and excluded from the data used to perform business analysis. However, human error can cause dummy instances to fail to be registered, or the production environment data may be manipulated by malicious end users, resulting in improper data tainting the business analysis. For example, a business may falsely conclude based on testing data (as opposed to customer data) in the production environment that a hard drive in its storage system is about to fail, and send a replacement where none was actually required.

Therefore, there is a need to identify unusual user/application interactions in the production environment, like testing and hacking, so the data they produce may be excluded from business analysis. Moreover, there is a need to identify these interactions without consuming resources in the production environment that could otherwise be devoted to serving end users.

SUMMARY OF DISCLOSED EMBODIMENTS

Disclosed embodiments model activities in the production environment as sequences of microservices, and identify unusual activities by analyzing these sequences. In particular, a directed graph of usual activity is formed as a basis for determining unusual activities. Next, activities that were actually performed are determined by statistically analyzing records of microservice invocation in application diagnostic files. These activity sequences are overlaid on the directed graph to determine relative fit by using a trace coverage percentage score. Application instances or activities with low relative fit are deemed suspicious. If the low fit persists for an extended duration, then the instances or activities are deemed unusual and an individual is alerted to begin a manual review.

Disclosed embodiments have several advantages. First, embodiments use a self-learning model that provides predictable identification of all kinds of irregular or bogus activities. Next, extended use of embodiments may remove all non-useful data from the production databases. Embodiments permit an application provider to monitor customer data in an intelligent way to provide accurate production data, improving the quality of business decisions based on those data. Because they are self-learning, embodiments scale with new applications, new activities, and new microservices. Unlike static methods, detection of unusual activities is based on actual end user behavioral patterns, and as these patterns change over time, so does the model. Thus, embodiments are able to decrease incorrect unusual activity determinations over time.

Thus, a first embodiment is a system for alerting an individual to unusual activities in an enterprise production environment executing a plurality of instances of an application. The system operates in two phases: extracting activities performed in the production environment, and identifying which of those activities are unusual. For extracting activities, the system has a natural language processor configured for identifying a sequence of microservices accessed by each of the plurality of instances using natural language processing. The system also has a classifier configured for classifying the sequence of microservices into a sequence of activities. The system further has a feature vector generator configured for generating feature vectors for each activity in the sequence of activities.

To identify unusual activities and alert the individual, the system has a graph processor configured for creating from the feature vectors a directed graph having nodes and directed edges, each node of the graph representing a microservice and each directed edge of the graph representing a transition between microservices during an activity. The system also has an instance activity database configured for storing heuristic data records pertaining to the application instances. And the system has an unusual activity detector configured to perform three tasks. The unusual activity detector is configured for overlaying, on the directed graph, activities executed by a given instance to determine whether the given instance is suspicious. The unusual activity detector is also configured for updating the stored heuristic data for the given instance in the instance activity database accordingly. And the unusual activity detector is configured for alerting the individual when the given instance remains suspicious for a given duration of time, as determined by the stored heuristic data.

In some embodiments, an application instance in the plurality of instances generates a log file, and the natural language processor is configured for identifying the sequence of microservices by using natural language processing on the log file. In some embodiments, the natural language processor is configured to use natural language processing comprising one or more of: sentence segmentation, tokenization, identifying parts of speech, lemmatization, identifying stop words, identifying noun phrases, and coreference resolution.

In some embodiments, the classifier is configured for classifying the sequence of microservices into the sequence of activities using a generative statistical model. In some embodiments, the generative statistical model operates according to a latent Dirichlet allocation.

In some embodiments, the feature vector generator is further configured for generating feature vectors including one or more of: a list of microservices visited by all of the activities in the sequence of activities, a list of activities in sequential order, and an average URI hit rate.

In some embodiments, the graph processor is configured for creating the directed graph from the feature vectors by creating one node for each microservice in the list of microservices, and creating the directed edges by tracing each activity in the list of activities over the nodes.

In some embodiments, the instance activity database is configured for storing heuristic data records comprising: a unique application instance identifier, a record last update time, a trace coverage value representing a percentage of both nodes and edges of the directed graph traversed since the record last update time, a suspiciousness time, and a suspiciousness flag. In some embodiments, the unusual activity detector is configured for determining that the given instance is suspicious when either (a) the trace coverage value is less than a first pre-defined threshold, or (b) the given instance has been inactive for a duration greater than a second pre-defined threshold, or both (a) and (b); and, when the given instance is determined to be suspicious, setting the suspiciousness time to the current time and the suspiciousness flag to TRUE in a data record for the given instance.

And in some embodiments, the unusual activity detector is configured for determining that the given instance is suspicious when both (a) overlaying the activities executed by the given instance includes a microservice or transition absent from the graph, and (b) the microservice or transition is not described in a policy file for the application; and for adding to the graph a node representing the microservice or an edge representing the transition when the given instance was not determined to be suspicious.

A second embodiment is a method of alerting an individual to unusual activities in an enterprise production environment executing a plurality of instances of an application. The method also operates in two phases: extracting activities performed in the production environment, and identifying which of those activities are unusual. To extract the activities, the method includes identifying a sequence of microservices accessed by each of the plurality of instances using natural language processing. The method next includes classifying the sequence of microservices into a sequence of activities. And the method includes generating feature vectors for each activity in the sequence of activities.

To identify unusual activities and alert the individual, the method calls for creating, from the feature vectors, a directed graph having nodes and directed edges, each node of the graph representing a microservice and each directed edge of the graph representing a transition between microservices during an activity. Then the method includes overlaying, on the directed graph, activities executed by a given instance to determine whether the given instance is suspicious, and updating stored heuristic data for the given instance accordingly. Finally, the method includes alerting the individual when the given instance remains suspicious for a given duration of time, as determined by the stored heuristic data.

In some embodiments, an application instance in the plurality of instances generates a log file, and identifying the sequence of microservices comprises using natural language processing on the log file. In some embodiments, using natural language processing comprises using one or more of: sentence segmentation, tokenization, identifying parts of speech, lemmatization, identifying stop words, identifying noun phrases, and coreference resolution.

In some embodiments, classifying the sequence of microservices into the sequence of activities comprises using a generative statistical model. In some embodiments, the generative statistical model operates according to a latent Dirichlet allocation.

In some embodiments, generating the feature vectors includes generating feature vectors including one or more of: a list of microservices visited by all of the activities in the sequence of activities, a list of activities in sequential order, and an average URI hit rate.

In some embodiments, creating the directed graph from the feature vectors comprises creating one node for each microservice in the list of microservices, and creating the directed edges by tracing each activity in the list of activities over the nodes.

In some embodiments, the stored heuristic data records comprise: a unique application instance identifier, a record last update time, a trace coverage value representing a percentage of both nodes and edges of the directed graph traversed since the record last update time, a suspiciousness time, and a suspiciousness flag. In some embodiments, determining that the given instance is suspicious comprises determining that either (a) the trace coverage value is less than a first pre-defined threshold, or (b) the given instance has been inactive for a duration greater than a second pre-defined threshold, or both (a) and (b), the method further comprising, when the given instance is determined to be suspicious, setting the suspiciousness time to the current time and the suspiciousness flag to TRUE in the data record for the given instance.

And in some embodiments, determining that the given instance is suspicious comprises determining that both (a) overlaying the activities executed by the given instance includes a microservice or transition absent from the graph, and (b) the microservice or transition is not described in a policy file for the application; the method further comprising adding to the graph a node representing the microservice or an edge representing the transition when the given instance was not determined to be suspicious.

Yet another embodiment is a tangible, computer-readable storage medium, in which is non-transitorily stored computer program code that, when executed by a computing processor, performs the method described above, or any of its variants.

It is appreciated that the concepts, techniques, and structures disclosed herein may be embodied in other ways, and thus that the above summary of embodiments is illustrative, not exhaustive.

DESCRIPTION OF THE SEVERAL VIEWS OF THE DRAWINGS

The manner and process of making and using the disclosed embodiments may be appreciated by reference to the drawings, in which.

DETAILED DESCRIPTION OF EMBODIMENTS

In this specification, including the appended claims, the following quoted terms shall have the indicated meanings that are not limited to specific embodiments, except where expressly indicated otherwise:

An "activity" is a logical function, performed by a software application, that was directly requested by an application user. Activities may include, illustratively and without limitation: logging in to or out of the application, requesting data (e.g. a user interface) from the application, activating a control in the user interface, requesting a search of the application's data, and so on.

A "microservice" is a self-contained, modular building block of application functionality. Illustratively, a microservice may retrieve a user profile based on a user ID, or return a set of raw search results based on a database query, or form a web page using a collection of visual elements, among many other tasks. A single activity may perform its logical function by accessing a sequence of several microservices in a particular order, and different activities with overlapping functionality may access the same microservice.

Figure 1A:
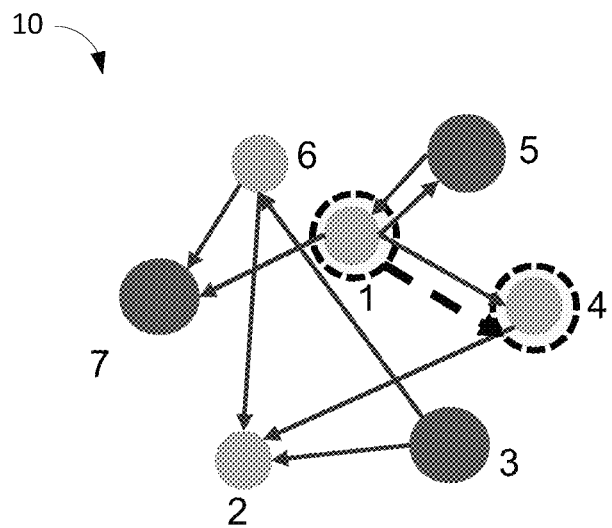
FIGS. 1A and 1B are directed graphs representing activity sequences in a typical application executing in an enterprise production environment.
Figure 1B:
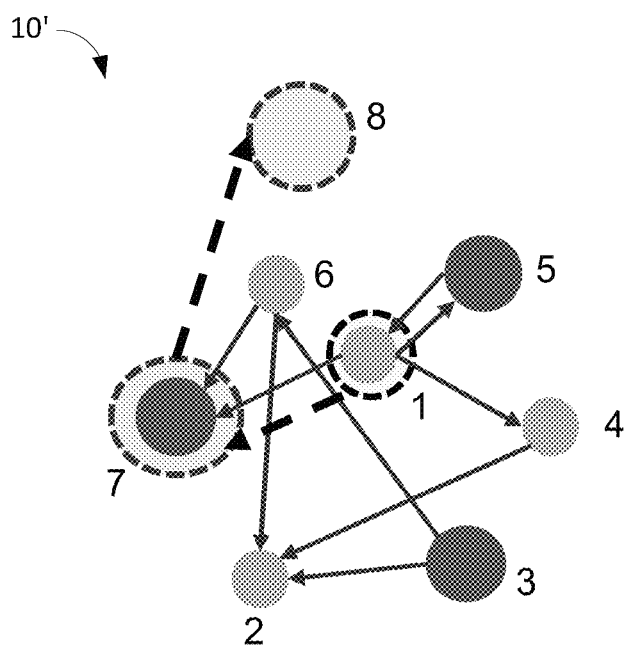

In FIGS. 1A and 1B are shown directed graphs 10 and 10' representing activity sequences in a typical application executing in an enterprise production environment. The directed graph 10 of FIG. 1A includes seven nodes that represent microservices 1-7. Each node of the graph represents a single microservice in the application, while each edge of the graph represents a transition from one microservice in execution order; that is, in the order in which an application instance might execute sequences of microservices to perform an activity in the production environment.

Solid edges between nodes represent all valid transitions from one microservice to another in execution order. Thus, each activity that uses microservice 1 may next use microservice 4, 5, or 7 based upon the activity. Microservice 2 is terminal in the directed graph 10, in the sense that every activity that uses microservice 2 subsequently completes without using any subsequent microservice. Illustratively, microservice 2 might construct a final web page for provision to the end user based on functions executed by all prior microservices. Similarly, microservice 3 is initial in the directed graph 10, in the sense that it may only be the first microservice used by an activity since there are no directed edges point to it. Illustratively, microservice 3 may process parameters received from a user (e.g. HTTP GET or POST parameters) to determine how to configure or perform an activity (e.g. an activity requested by the user accessing a particular URI).

Some pairs of nodes do not have edges between them, corresponding to there being no valid transitions between microservices in execution order. Likewise, some pairs of nodes have edges between them only in one direction, corresponding to these microservices being validly executed in order only in the indicated direction. Validity of the presence of nodes in the graph, and validity of each directed edge, may be determined using a policy file for the given application. Policy files are described in more detail below in connection with FIG. 2.

A sequence of microservices used by a particular activity may be overlaid on such a directed graph. Illustratively, the sequence 1→4 has been overlaid on the directed graph 10, using dashed circles around the nodes and a dashed arrow between them. This is a valid sequence of microservices for a production activity because (a) node 1 is present, (b) node 4 is present, and (c) the graph already contains is a directed edge from node 1 to node 4.

Consider, however, a sequence of microservices 1→7→8 as shown in directed graph 10' in FIG. 1B. This is not a valid sequence of microservices based on the directed graph 10 of FIG. 1A, because node 8 is not present in that graph. In various embodiments that build directed graphs in real time, the sequence of microservices may actually be valid because node 8 might be a valid node that has not yet been added to the directed graph. Such embodiments may determine whether node 8 represents a valid microservice in a number of ways; illustratively, the policy file mentioned above may be consulted. If the policy file includes a corresponding microservice, and does not indicate that a transition between microservices 7 and 8 is invalid, then the embodiment may modify the directed graph 10 to be the directed graph 10', and add a directed edge between microservices 7 and 8. Details of this process are described below in connection with FIG. 7.

It is appreciated that the heuristic characteristics of microservices, executed by a particular application instance, may provide an indication that the instance is performing activities that are not authorized or expected for the enterprise production environment. In some cases, the activities may be for the purpose of testing individual microservices, and the individual requesting those activities did not realize that the request was made in the production environment. In other cases, the activities may be performed by malicious users for unauthorized purposes, such as to deny application functionality to other users or to access personal data. Regardless of their purposes, application instances in the production environment may perform unauthorized or unusual activities, and embodiments of the concepts, techniques, and structures disclosed herein may be used to warn application administrators, software developers, or others that unusual activities are taking place.

Figure 2:
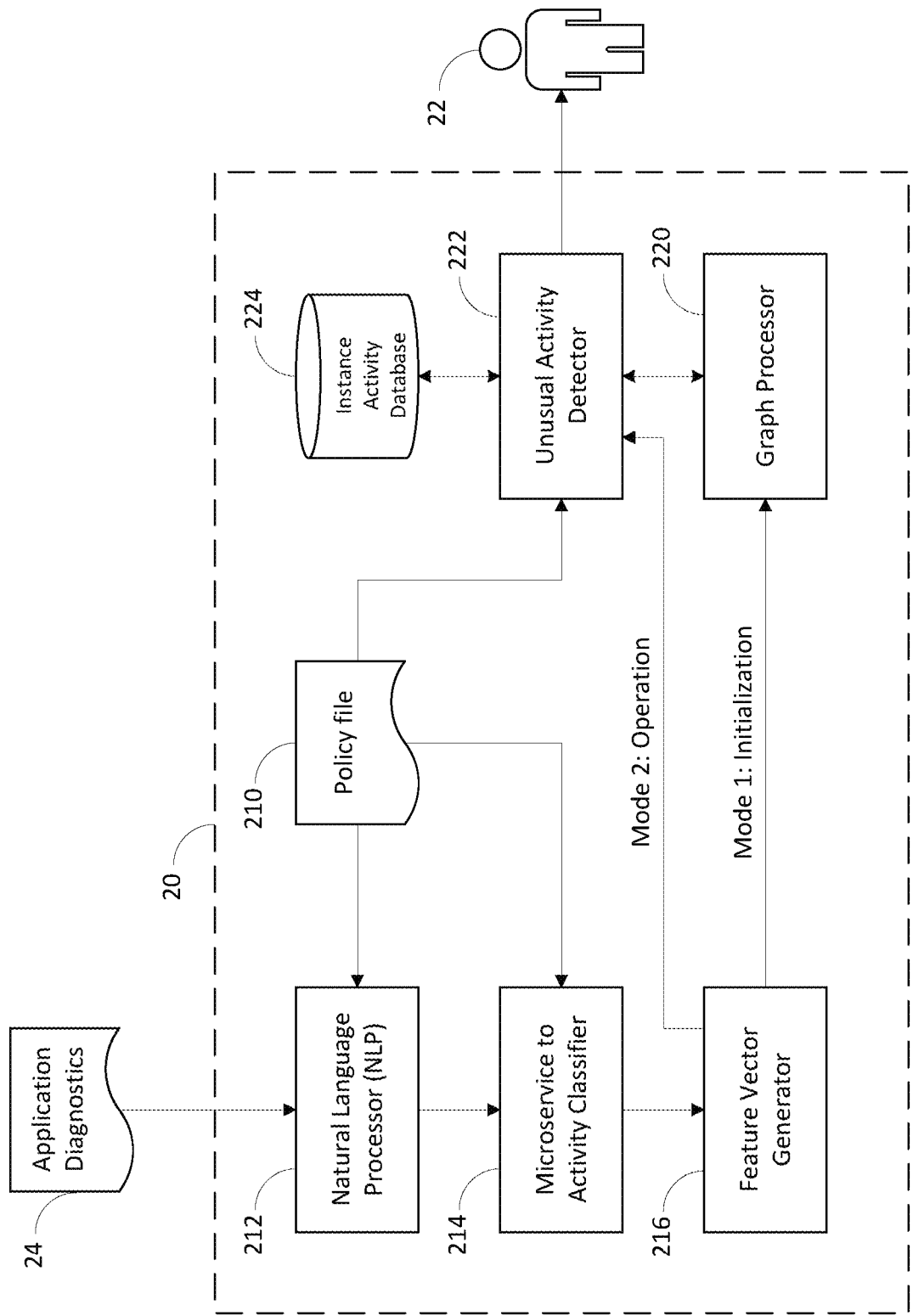
FIG. 2 schematically shows a system for alerting an individual to unusual activities in an enterprise production environment, according to an embodiment of the concepts, techniques, and structures disclosed herein.

Thus, in FIG. 2 is schematically shown a system 20 for alerting an individual 22 to unusual activities in an enterprise production environment executing a plurality of instances of an application, according to an embodiment of the concepts, techniques, and structures disclosed herein. The system 20 may be implemented in whole or in part using any suitable hardware, or combination of hardware and software, including without limitation the computer shown in FIG. 8. The system 20 takes application diagnostics 24 as its input, and alerts the individual 22 as its output. It is appreciated that the system 20 may be implemented on hardware separate from that executing the application, or on a resource-sharing basis with the executing application, in a manner that advantageously does not degrade the usual performance characteristics of the application.

The system 20 operates generally in two phases. In the first phase, activities are identified as having been performed by a target application in the production environment, and their features are characterized in feature vectors. The second phase is divided into initialization and operational modes. In the initialization mode of the second phase, select activities are identified as initialization data, and a directed graph is constructed from the feature vectors describing these activities. The directed graph represents usual or ordinary activity within the production environment. In the operational mode of the second phase, additional activities from a given application instance are "played" or overlaid onto the directed graph to determine whether the features of those activities are similar to those of ordinary activities. If not, the instance is flagged as suspicious. The process is repeated over time, to ensure that the comparison of the instance's activities to the graph is statistically sound. If the instance remains suspicious for a certain amount of time, then the instance is flagged as performing unusual activities, and the individual 22 is alerted.

The system 20 includes a policy file 210. For purposes of this disclosure, an "application policy file" (or just "policy file") is a document that embodies application behavioral patterns in the production environment. It may be prepared by or on behalf of an individual or organization that controls execution of the application. Illustratively, the policy file 210 may describe, among other things: different modules or microservices; their launch dependencies; their orders of execution by different activities within the application; any uniform resource locators (URLs) or uniform resource identifiers (URIs) associated with each microservice, activity, or the overall application; expected minimum and/or maximum "hit rates" or access counts for each of the URLs or URIs by day, week, month, or other appropriate duration; any application-specific data encoded e.g. as key-value pairs; and other application descriptors of a similar nature.

The system 20 includes a natural language processor 212 configured for identifying a sequence of microservices accessed by each of the plurality of instances using natural language processing. The natural language processor 212 identifies microservices, described in the policy file 210, that were executed by respective application instances as recorded in the application diagnostics 24. These microservices are identified by named entities. As is known in the art of natural language processing (NLP), a "named entity" is any object or thing that has been named. The application diagnostics 24 may be, in illustrative embodiments, one or more log files generated by corresponding application instances. Thus, the named entities of relevance to embodiments disclosed herein are microservices executing in the production environment, and the natural language processor 212 illustratively is configured for identifying the sequence of microservices by using NLP on the log files. The operation of the natural language processor 212 is described in more detail below in connection with FIG. 4.

The system 20 also includes a microservice-to-activity classifier 214 configured for classifying each sequence of microservices into a sequence of activities. The classifier 214 operates using known sequences of activities described in the policy file 210. It is appreciated that the same microservice may be used in multiple activities, and thus that the mapping of microservice sequences to activity sequences may require predictive techniques. The operation of the classifier 214 is described in more detail below in connection with FIG. 5.

The system 20 further includes a feature vector generator 216 configured for generating feature vectors for each activity in the sequence of activities. The feature vector generator 216 quantifies and assigns features to the activities that may be used in the second phase to either create the directed graph of microservices, or to identify unusual activities. Features described by feature vectors illustratively include a list of microservices visited by all of the activities in the sequence of activities, a list of activities in sequential order, and an average URI hit rate.

The natural language processor 212, classifier 214, and feature vector generator 216 together operate to extract activities from the application diagnostics 24 using the policy file 210, and provide the activities with feature vectors for further processing. That further processing occurs in the second phase of operation, which has both initialization and operational modes that operate on a directed graph.

Thus, the system 20 includes a graph processor 220 configured for creating, from the initialization feature vectors, a directed graph having nodes and directed edges. Each node of the graph represents a microservice, and each directed edge of the graph represents a transition between microservices during an activity. During the initialization mode, the feature vector generator 216 passes feature vectors directly to the graph processor 220, as indicated in FIG. 2. In illustrative embodiments, the graph processor is configured for creating the directed graph from the feature vectors by creating one node for each microservice in the list of microservices, and creating the directed edges by tracing each activity in the list of activities over the nodes. The graph processor 220 may keep a count of the number of times that each edge between nodes is traced, and the final counts may indicate a relative frequency that different edges are traversed during normal activities. This relative frequency may be used to weight the different edges when determining a degree of relative fit, described below in connection with FIG. 6.

The system 20 also includes an unusual activity detector 222. During its operational mode, the feature vector generator 216 passes feature vectors directly to the unusual activity detector 222, as indicated in FIG. 2. In illustrative embodiments, the unusual activity detector 222 operates by overlaying, on the directed graph maintained by the graph processor 220, activities executed by a given instance and described by the feature vectors, to determine whether the given instance is suspicious. In situations where this overlaying process includes a node that is not already in the directed graph, the unusual activity detector 222 may consult the policy file 210, as indicated, for information about the microservice represented by that node. The operation of the unusual activity detector 222 is described in more detail below in connection with FIG. 6.

The unusual activity detector 222 determines that a particular instance is suspicious over time, and therefore must save its state. In this connection, the system 20 has an instance activity database 224 configured for storing heuristic data records pertaining to the application instances. The unusual activity detector 222 is configured for updating the stored heuristic data for the given instance in the instance activity database according to its determination of whether or not a given instance is behaving suspiciously. Illustrative data held in these records, and an illustrative method by which they are updated in the operational mode after detecting unusual activity (or detecting normal activity), are described in more detail below in connection with FIG. 6.

It is appreciated that the process of developing an application may be ongoing, and that new activities or feature might be rolled out over time. Additional microservices may be deployed, for instance, or different activities may be provided that use those microservices. Therefore, the directed graph may need to be updated as a result of later activities performed in the production environment; illustrative processes for doing so by the unusual activity detector are described below in connection with FIG. 7.

The unusual activity detector 222 also is configured for alerting the individual 24 when the given instance remains suspicious for a given duration of time, as determined by the stored heuristic data. Alerting may be performed using any system, mode, or mechanism known in the art, which may be adjusted according to the preference of the individual 24. Thus, illustratively, the unusual activity detector 222 may alert the individual 24 by placing an automated telephone call, or by sending a text message, or by sending an email, or by registering the alert in a system monitoring dashboard, or by any other, similar technique.

Figure 3:
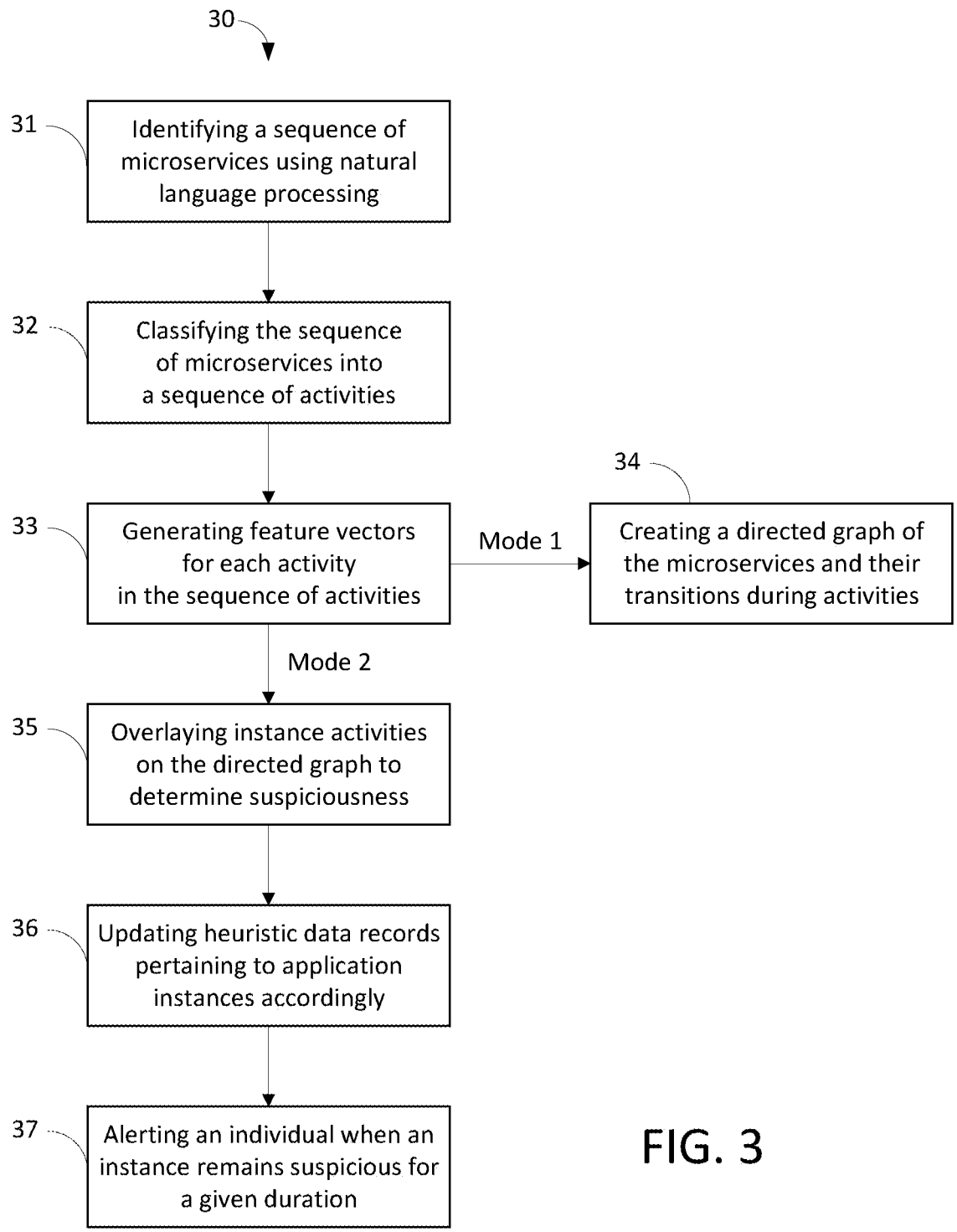
FIG. 3 is a flowchart for a method of alerting an individual to unusual activities in an enterprise production environment, according to an embodiment of the concepts, techniques, and structures disclosed herein.

In FIG. 3 is shown a flowchart for a method 30 of alerting an individual to unusual activities in an enterprise production environment executing a plurality of instances of an application, according to an embodiment of the concepts, techniques, and structures disclosed herein. The method 30 may be performed by any suitable hardware, or combination of hardware and software, including without limitation the system shown in FIG. 2, the computer shown in FIG. 8, or a combination thereof. It is appreciated that the method 30 may be performed on hardware separate from that executing the application, or on a resource-sharing basis with the executing application, in a manner that advantageously does not degrade the usual performance characteristics of the application.

The method 30 is described below in connection with a single application. However, it is appreciated that the method 30 may be performed separately with respect to any number of applications executing simultaneously within a production environment. It is further appreciated that the method 30 may be performed with respect to any number of instances (running copies) of a single application within the production environment.

The method 30 utilizes the directed graphs of microservices, such as those shown in FIGS. 1A and 1B. More particularly, the method 30 creates a directed graph of microservices and transitions between them in an initialization phase, based on prior performance data for the application in the production environment. The directed graph may be validated against an external data source, such as an application policy file. Then, in an operational phase, the method 30 replays additional activities on the validated directed graph to determine whether those activities have the same heuristic properties as found in the graph. If not, the method 30 determines that these additional activities are suspicious, and may require further investigation. The method 30 is now described in detail.

The method 30 begins with a process 31 of identifying a sequence of microservices accessed by each of the plurality of instances using natural language processing (NLP). These microservices are identified by named entities. The process 31 may use any authoritative source listing the microservices that are, or might legitimately be, executing in the production environment. In illustrative embodiments, the authoritative source is a policy file. The operation of the process 31, which corresponds to the natural language processor 212, is described in more detail below in connection with FIG. 4.

The method 30 continues with a process 32 of classifying the sequence of microservices into a sequence of activities. For example, if A, B, C, and D are microservices, then two activities might have sequences of microservices A→B→C and D→C, respectively, and the classification of microservices into activities may be listed in this manner in the policy file. In this example, the microservice "C" was used by both activities. Thus, as noted above, the same microservice may be used in multiple activities, and the mapping of microservice sequences to activity sequences may require predictive techniques. The operation of the process 32, which corresponds to the classifier 214, is described in more detail below in connection with FIG. 5.

The method 30 proceeds with a process 33 of generating feature vectors for each activity in the sequence of activities. To generate feature vectors for each activity, the process 33 may assign metadata to each microservice or transition between microservices. These metadata may include, among other things, a list of microservices visited by all of the activities in the sequence of activities, a list of activities in sequential order, and an average URI hit rate.

Together, process 31 identifying the sequence of microservices, process 32 classifying the sequence of microservices into a sequence of activities, and process 33 generating feature vectors for each activity operate to extract activities application diagnostics and provide the activities with feature vectors for further processing. That further processing occurs in the second phase of operation, which has both initialization and operational modes that operate on a directed graph.

In the first, initialization mode, the method 30 continues with a process 34 of creating, from the initialization feature vectors, a directed graph of the microservices. Each node of the graph represents a microservice, and each edge of the graph represents a transition between microservices during an activity. The process 34 may include creating the directed graph from the feature vectors by creating one node for each microservice in the list of microservices, and creating the directed edges by tracing each activity in the list of activities over the nodes. The process 34 may keep a count of the number of times that each edge between nodes is traced, and the final counts may indicate a relative frequency that different edges are traversed during normal activities. This relative frequency may be used to weight the different edges when determining a degree of relative fit, described below in connection with FIG. 6.

During the second, operational mode, the method proceeds from process 33 to a process 35 of overlaying, on the directed graph created by process 34, activities executed by a given instance to determine whether the given instance is suspicious. The operation of the unusual activity detector 222 is described in more detail below in connection with FIG. 6.

Determining that a particular instance is suspicious may occur over time, and therefore the state of the determination must be saved. In this connection, the method 30 may include storing or updating heuristic data records pertaining to the application instances. Illustrative data held in these records, and an illustrative method by which they are updated after detecting unusual activity (or detecting normal activity), are described in more detail below in connection with FIG. 6.

It is appreciated that the process of developing an application may be ongoing, and that new activities or feature might be rolled out over time. Additional microservices may be deployed, for instance, or different activities may be provided that use those microservices. Therefore, the directed graph may need to be updated as a result of later activities performed in the production environment; illustrative processes for doing so are described below in connection with FIG. 7.

The method 30 may conclude with a process 37 for alerting an individual when the given instance remains suspicious for a given duration of time, as determined by the stored heuristic data. The process 37 may be performed using any system, mode, or mechanism known in the art, which may be adjusted according to the preference of the individual. Thus, illustratively, process 37 may include placing an automated telephone call, or sending a text message, or sending an email, or registering the alert in a system monitoring dashboard, or any other, similar technique.

Figure 4:
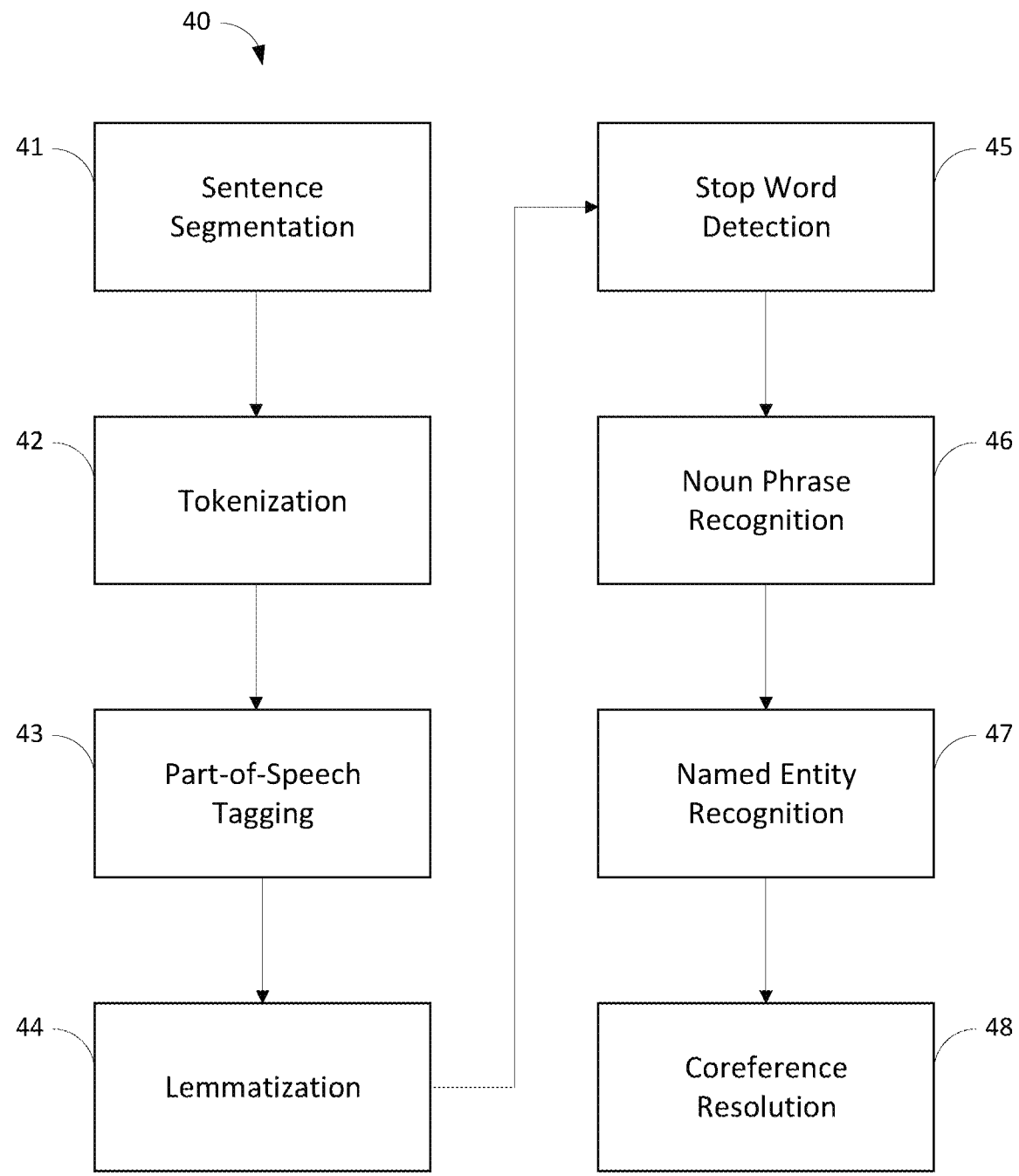
FIG. 4 is a flowchart of processes that perform natural language processing (NLP) to produce normalized and filtered NLP data according to an embodiment.

In FIG. 4 is shown a flowchart for a method 40 that performs natural language processing (NLP) to produce normalized and filtered NLP data according to an embodiment. The processes include sentence segmentation 41, tokenization 42, part-of-speech tagging 43, lemmatization 44, stop word detection 45, noun phrase recognition 46, named entity recognition 47, and coreference resolution 48. While these processes 41-48 are known in the prior art, their use with the system 20 (especially the natural language processor 212) and the method 30 (especially the NLP process 31) are new, and are described below with attention paid to their use in this connection. It is appreciated that NLP may be performed using less than all of these processes, and that the processes may be performed in a different order. Thus, the flowchart 40 of FIG. 4 is illustrative only, and not limiting.

The processes of the method 40 may determine valid or expected named entities from a policy file or other authoritative source of named microservices by parsing the file according to an agreed file format. The file format of the policy file may be any standard format, including the extensible markup language (XML) or any of its variants, or JavaScript Object Notation (JSON), or any other suitable format for formatting file data. The processes may identify the valid or expected named entities as the sequence of microservices by parsing application diagnostic files, such as log files. These files may have any file format for storing application diagnostic information, which may be unique to the particular application. Thus, identifying the sequence of microservices may include using natural language processing on the log files.

The process 41 performs sentence segmentation on the input data. Sentence segmentation divides the input data into semantically-complete sentences. This must be done using the file format of the input file. For instance, an application diagnostic (log) file may separate text representing logging events using a carriage return (CR) character, or a new line (NL) character, or a combination of both (CRNL), or some other character. The process 41 may split the file according to these character, or using some other definition of "sentence", into a list of sentences.

The process 42 performs tokenization on each sentence. Tokenization divides a sentence into grammatical tokens, e.g. words. Words may be separated by space characters, or other characters defined by the file format.

The process 43 identifies a part of speech for each word. Parts of speech include nouns, adjectives, verbs, adverbs, conjunctions, and so on. Identification of parts of speech is a complex process that relies on the particular grammar that sentences are allowed to have. For instance, the word "set" may be a noun or a verb, and its part of speech must be determined by how it is used in its sentence. Context-free grammars may be defined, for instance, using the Backus-Naur form (BNF) that defines expressions in terms of other expressions, raw tokens, and connecting characters. Provided that the sentences that may appear in a policy file or an application diagnostic file are sufficiently simple, a person of ordinary skill in the art will be able to straightforwardly define a grammar to describe them.

The process 44 performs lemmatization on each word. Lemmatization is the process of determining a word's lemma or dictionary form from its context within a sentence. For instance, lemmatization would obtain "drive" from the inflected verbs drive, driving, drives, driven, or drove. Lemmatization may be distinguished from stemming, which performs the same task without knowledge of the word's part of speech. It is appreciated, therefore, that various embodiments may replace processes 43 and 44 with a single stemming process while remaining within the concepts and techniques disclosed herein. However, it is appreciated that a stemming process may have difficulty determining lemmas of various words such as "meeting", whose lemma is "meet" if used as a verb, but "meeting" if used as a noun. Thus, embodiments should take care to use very simple grammars whenever possible.

The process 45 performs stop word detection. Stop words are common words that may or may not be used as part of a noun phrase. For instance, "who" is a pronoun because it can take the place of a person, but "The Who" is a proper noun—the linguistic distinction between the two turns on whether the word "the" is or is not a stop word. The process 45 determines which words are stop words, and should be filtered out of the input before processing continues. It is appreciated that, depending on the grammars selected for the policy file and the application diagnostic files, the process 45 may not be necessary.

The process 46 combines words into noun phrases. While tokenization breaks sentences into words, some nouns are described by more than one word. For instance, "Thomas Jefferson" is a proper noun that is described using two words, and process 46 identifies which nouns are described by noun phrases. The grammars used for the policy file and the application diagnostic files may define noun phrases as one or more nouns or a noun and adjectives and/or adverbs, e.g. using BNF, and thus noun phrases may be automatically identified without expressly combining words or tokens during processing.

The process 47 performs named entity recognition. Named entities are nouns having particular names, and processes 41-46 detect these nouns, whether as single words or as phrases. The process 47 then classifies these named entities into categories, such as personal names, organizational names, location names, dates and times, quantities, percentages, and so on. This classification may be performed, for example, by referring to lists of named persons, organizations, locations, and so on, or using other techniques known in the art.

Finally, the process 48 performs coreference resolution. The named entities "New York City" and "The Big Apple" are different as named entities, but they both refer to the same city. The process 48 resolves these coreferences into a single referent, so appearances of its various co-referents in different places within the same sentence, or even within different sentences, are subsequently recognized correctly as referring to the same, underlying noun.

Thus, it is appreciated that the method 40 converts an input policy file or application diagnostic (log) file to an output list of named entities and their co-referents. These named entities and co-referents may be filtered, e.g. by the classifier 214 or the classifying process 32 using the policy file, to leave only the microservices as described herein.

As discussed above, application diagnostic or log files may include a great deal of information from microservices that are invoked by various activities. However, microservices that generate the log files themselves may not know which activity invoked them. This lack of information arises by design of the microservice architecture, in which microservices are highly modular and may be used by many different activities. However, in accordance with various embodiments, it is desired to learn, from the microservices identified as named entities in these log files, which activities users initiated to invoke them, because these activities may be unusual and be contaminating the log files themselves with unwanted or inaccurate data. This is accomplished via statistical classification.

There are two broad approaches to statistical classification. One begins with an observable variable X and a latent or inferred "label" variable Y. The generative approach allows generation of new data by modeling the joint probability distribution P(X,Y), while the discriminative approach permits distinguishing between different kinds of data by modeling the conditional probability P(Y|X). Disclosed embodiments take the observable variable X to be the sequence of microservices, identified from natural language processing described above, and take the latent variable Y to be the activity that invoked them. It has been found that models that predict the next word in a sentence are more effective when they are generative, because they are able to assign a probability to a sequence of words. Thus, disclosed embodiments classify the sequence of microservices into the sequence of activities using a generative statistical model to predict the likelihood of the next microservice encountered in the data stream. However, it is appreciated that discriminative models might be used instead of predictive methods.

Generative models come in a variety of forms. Common models are the hidden Markov model, probabilistic context-free grammars, Bayesian networks, generative adversarial networks, and latent Dirichlet allocation, among others. Of these, latent Dirichlet allocation (LDA) has been determined to work the best to solve the problem at hand. LDA applies to "documents" that include "words" from various "topics". The words (or named entities) that appear in documents comprise a limited number of topics, which themselves need not appear in those documents explicitly. One assumes various probability distributions based on this framework, and applies statistical techniques to infer the probability that each particular named entity actually found in a document (or data stream) belongs to each topic, based on the characteristics of all of the other named entities. Thus, a joint probability distribution P(X,Y) is inferred, after which one may view the most likely distribution of each particular microservice to an activity P(Y|X=x) as indicating the correct assignment.

Figure 5:
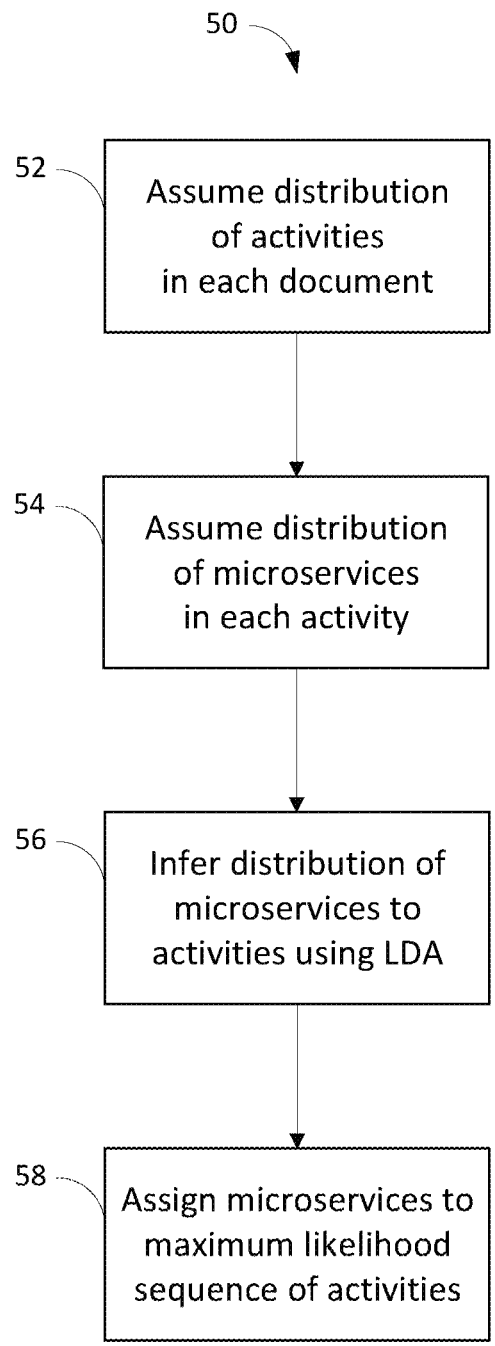
FIG. 5 is a flowchart of processes that classify NLP data into a sequence of activities according to an embodiment.

Thus, in FIG. 5 is shown a flowchart for a method 50 that classifies NLP data into a sequence of activities using LDA according to an embodiment. While these processes 52-58 are known in the prior art, their use with the system 20 (especially the classifier 214) and the method 30 (especially the classifying process 32) are new, and are described below with attention paid to their use in this connection. It is appreciated that classifying microservices into activities may be performed using other techniques known in the art; however, the processes shown in the flowchart 50 have been found particularly effective at this task. Thus, the method 50 of FIG. 5 is illustrative only, and not limiting.

In process 52, one assumes a distribution of activities in each document. That is, one assumes that any given activity appears in any given document according to a Dirichlet probability distribution parameterized by a vector a whose entries represent individual activity probabilities. As known in the art, the Dirichlet distribution is the conjugate prior of the multinomial distribution, and is therefore often used as a prior probability distribution in Bayesian statistics. The particular values for a may be illustratively obtained by analyzing expected external URI hit rates for each activity, e.g. as defined in the policy file, or using similar data obtained elsewhere.

In process 54, one next assumes a distribution of microservices in each activity. That is, one assumes that any given microservice was invoked by any given activity according to a second Dirichlet probability distribution parameterized by a vector whose entries represent individual microservice probabilities. The particular values for may be illustratively obtained by analyzing which microservices are invoked and which are not by corresponding activities, e.g. as defined in the policy file, or using similar data obtained elsewhere.

In process 56, one takes as input the sequence of microservices obtained using NLP on one or more application log files, and infers a distribution of the likelihood that each subsequent microservice was invoked by a particular activity. It is appreciated that the inference may consider both the particular document in which the microservice was found, and the position of the microservice in that document.

Finally, in process 58, one assigns each microservice to its maximum likelihood activity, thereby producing a sequence of activities. It is appreciated that any given activity may be recorded in multiple different application log files, and that the log files may internally interleave records of microservices invoked by different activities.

Figure 6:
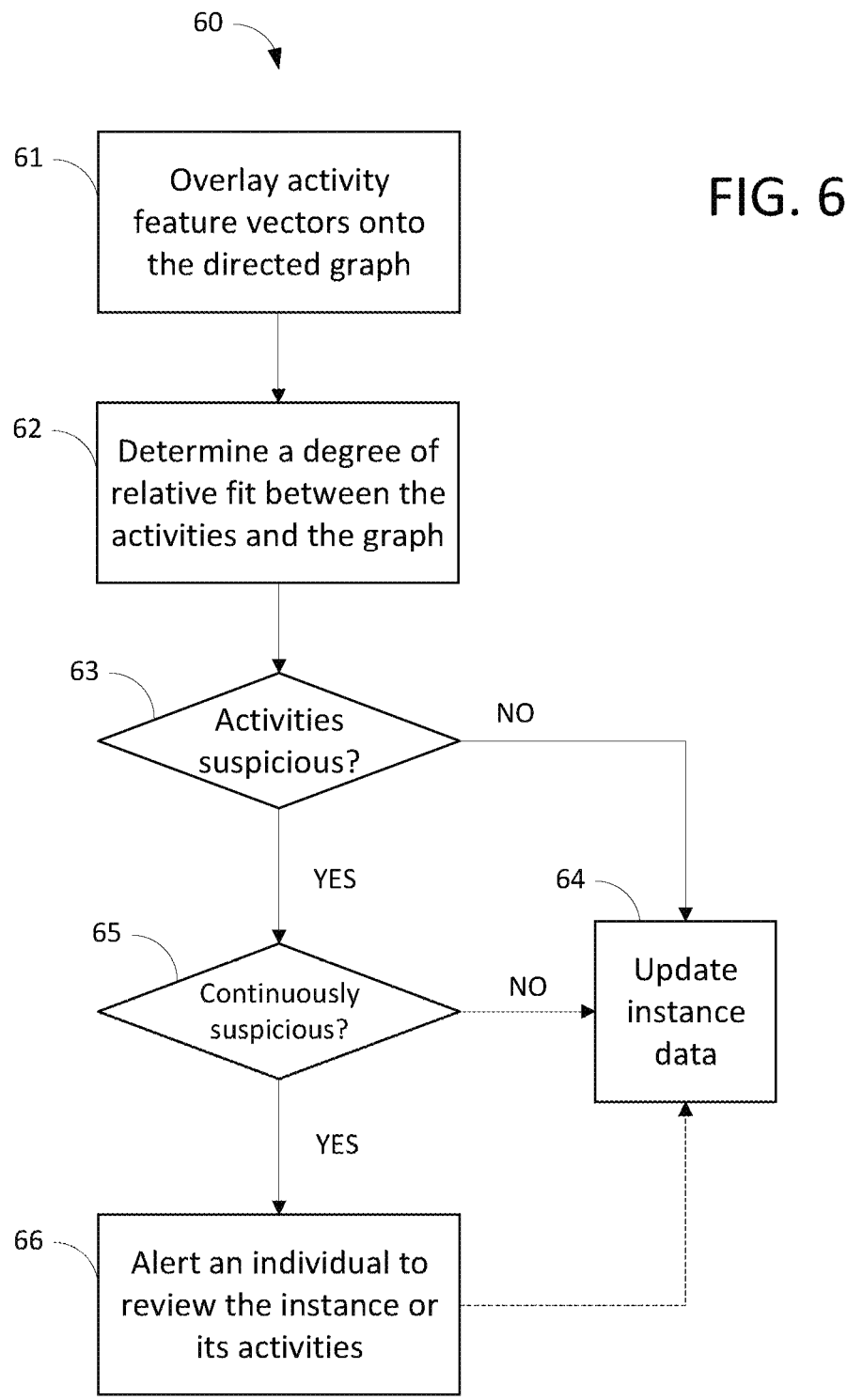
FIG. 6 is a flowchart of processes that detect suspicious patterns of activity for a given application instance according to an embodiment.

In FIG. 6 is shown a flowchart for a method 60 that detects suspicious patterns of activity for a given application instance according to an embodiment. The method 60 may be used by the system 20 (especially the unusual activity detector 222) or the method 30 (especially the overlaying process 35). The method 60 is responsible for predicting unusual or bogus activities in the application instances. Each application instance generates logs during normal operation. As those logs are updated, or at regular intervals, embodiments may process the updates via the methods 30, 40, and 50 to produce feature vectors for new activities, at which time the method 60 may be invoked to determine whether those feature vectors represent usual, or unusual, activities.

The method 60 begins with a process 61 of overlaying, on the directed graph of usual activities described above, the activities executed by a given instance. The latter activities are illustratively obtained from the activity feature vectors produced by the feature vector generator 216 or the process 33. Overlaying includes tracing the microservices invoked by the activity (or multiple activities) onto the graph along its nodes and directed edges keeping track of which nodes were visited and edges were followed. Overlay also may include keeping a count of the number of times each node was visited or edge was followed, i.e. the node and edge trace multiplicities. If the process 61 cannot complete because a microservice executed by an instance is not already in the directed graph, then the process 61 invokes a self-learning mode as described below in connection with FIG. 7.

Next, a process 62 determines a degree of relative fit between the activities and the directed graph. In accordance with disclosed embodiments, this degree of relative fit may be measured using a trace coverage ratio or trace coverage percentage. Illustratively, a trace coverage ratio may be computed by dividing the total number of nodes and edges traversed by activities in the application instance, into the total number of nodes and edges in the directed graph. A trace coverage percentage may be computed as 100 times the trace coverage ratio, and either number may be used to measure the degree of relative fit. A trace coverage ratio may be computed without counting multiple visits to each node or edge, or it may be computed counting multiplicities if they were tracked by the process 61 and if the nodes and/or edges are weighted with expected multiplicities. The latter weights were discussed above in connection with FIG. 2 and the graph processor 220, and in connection with FIG. 3 and the directed graph creating process 34.

Then, a decision process 63 evaluates whether the recent activities performed by the application instance are suspicious. Evaluation may consist of comparing the trace coverage ratio or percentage to a pre-defined threshold. If the overlay traces out less than 10% (for example) of the microservices for the application, then one might reasonably conclude that the particular application instance might have been used only for testing those particular microservices, and not for normal production activities. The threshold of 10% is merely illustrative, and other thresholds may be used such as 25%, 50%, 75%, or 90%. Larger thresholds might indicate that particular activities (rather than microservices) are being tested, but not the full range of activities that one might expect to see in a production application instance that is being used by external, end users.

The process 63 also may determine that the activities are suspicious if the instance has been inactive for a duration greater than a second pre-defined threshold. Activity instances that remain idle for long periods of time, such as 15 days, may reasonably be assumed to not be end-user facing, and thus may have been used for testing purposes. The duration of 15 days is merely illustrative, and different embodiments may use different thresholds to determine when inactivity becomes suspicious. The idle duration may be computed by accessing stored heuristic data records, described below, and in particular the record last update time for the given application instance as compared to the present time. Thus, the process 63 may determine that a given application instance is suspicious when either (a) the trace coverage value is less than a first pre-defined threshold, or (b) the given application instance has been inactive for a duration greater than a second pre-defined threshold, or both (a) and (b).

If the activities are not suspicious, then the method 60 proceeds to a process 64 of updating the stored heuristic instance data. In illustrative embodiments, the stored heuristic instance data may include a unique application instance identifier, a record last update time, a trace coverage value representing a percentage of both nodes and edges of the directed graph traversed since the record last update time, a suspiciousness time, and a suspiciousness flag. In this branch of the method 60, a data record containing the unique application instance identifier will be updated as follows. The record last update time will be set to the present time. The trace coverage value will be set to the trace coverage percentage. The suspiciousness time will be set to an undefined value (or left untouched for auditing purposes). And the suspiciousness flag will be set to FALSE, because the process 63 determined that the application instance is not suspicious.

However, if the activities are suspicious, then the method 60 proceeds to a second decision process 65 that evaluates whether the given application instance has been suspicious for greater than a third pre-defined threshold. It may be the case that an application instance might have activities that transiently appear suspicious. For example, when an instance first starts its trace coverage percentage may be artificially low simply because it hasn't had enough activities to invoke all of the relevant microservices, or its idle time may be high until it is worked into a load balancing rotation. These instances may appear initially suspicious, but will later be deemed usual.

In this situation, the method continues again to process 64, in which the stored heuristic instance data are updated as before, as follows. The record last update time will be set to the present time. The trace coverage value will be set to the trace coverage percentage. The suspiciousness time will be set to the current time, and the suspiciousness flag will be set to TRUE, because the process 63 determined that the application instance is behaving suspiciously.

If the given instance remains continuously suspicious for a given duration of time, such as 15 days, then the instance may be deemed genuinely unusual. In this situation, the method continues to the process 66 for alerting an individual to review the instance or its activities. Alerting may be accomplished as described above, using any conventional means. The duration of 15 days is illustrative only, and different embodiments may use different thresholds for determining how long an instance must remain suspicious before being flagged as unusual. After alerting the individual, the method 60 may optionally continue to the process 64, and update the instance data. In some embodiments, the instance data records include an additional field or fields to indicate the individual alerted, when the individual was alerted, the mode by which the individual was alerted, or other appropriate data.

Figure 7:
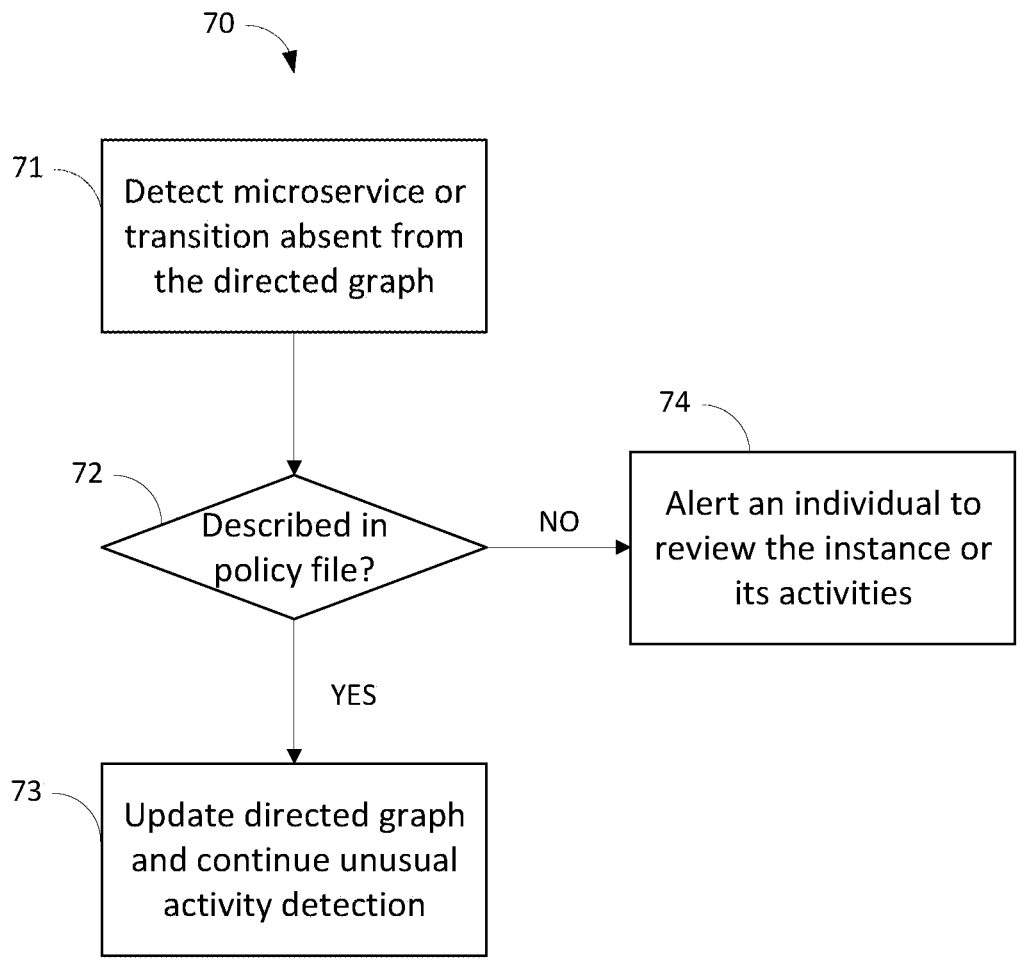
FIG. 7 is a flowchart of processes that update the directed graph of activities and transitions when a new microservice sequence is encountered according to an embodiment.

In FIG. 7 is shown a flowchart for a method 70 of updating the directed graph of activities and transitions when a new microservice sequence is encountered according to an embodiment. It is appreciated that directed graphs in accordance with the concepts, techniques, and structures disclosed herein may grow over time to include additional microservices and transitions between them. Growth of the directed graph during the initialization phase of an embodiment is described above in connection with the graph processor 220 and graph creation process 34. However, it may happen that the directed graph may grow during the operational phase of an embodiment.

Consider against FIGS. 1A and 1B, with their directed graphs 10 and 10' respectively. Suppose the graph 10 is created during the initialization phase from existing application log files, with the seven indicated nodes and the edges between them. Suppose also that the microservice labeled 8 is first encountered only during the operational phase, but is nevertheless expected during usual activity. The method 70 allows embodiments to learn that this "new" microservice, and the transition from node 7 to node 8, are part of a legitimate activity, expand the directed graph so that (in this example) it appears as directed graph 10', and avoid flagging the activity as suspicious or unusual.

The method 70 begins with a process 71 to detect a microservice or transition that is absent from the directed graph. The detection in the process 71 may result from overlaying activities executed by the given instance on the directed graph, as performed by the process 61 described above.

The method 70 continues to a decision process 72 in which the authoritative source (e.g. the application policy file) is consulted to determine whether the absent microservice or transition is listed therein. If a new transition between two existing microservices was detected, the policy file may be parsed to determine whether it lists an activity for which that transition comprises part of its sequence of microservices. Alternately, if a new microservice was detected (with a new transition from an existing microservice), the policy file may be parsed to determine whether it lists both the new microservice and an activity containing the new transition.

If the new microservice or transition is described in the policy file, then the given application instance is not determined to be suspicious, and the method 70 moves to a process 73 to update the directed graph and continue unusual activity detection with the updated graph. The process 73 modifies the existing directed graph to incorporate the new transition between existing nodes, or the new node and new transition from an existing node as the case may be. The graph processor 220 may provide an interface for enabling the unusual activity detector 222 to perform this operation in various embodiments. The method 70 may then terminate, and the process 61 may continue.

Alternately, if the new microservice or transition is not described in the policy file, then the given application instance is determined to be both suspicious and unusual, and the method 70 moves to a process 74 to alert an individual to review the instance or its activities (for a presumed misconfiguration). The process 74 may be implemented in the same manner as the process 66.

Figure 8:
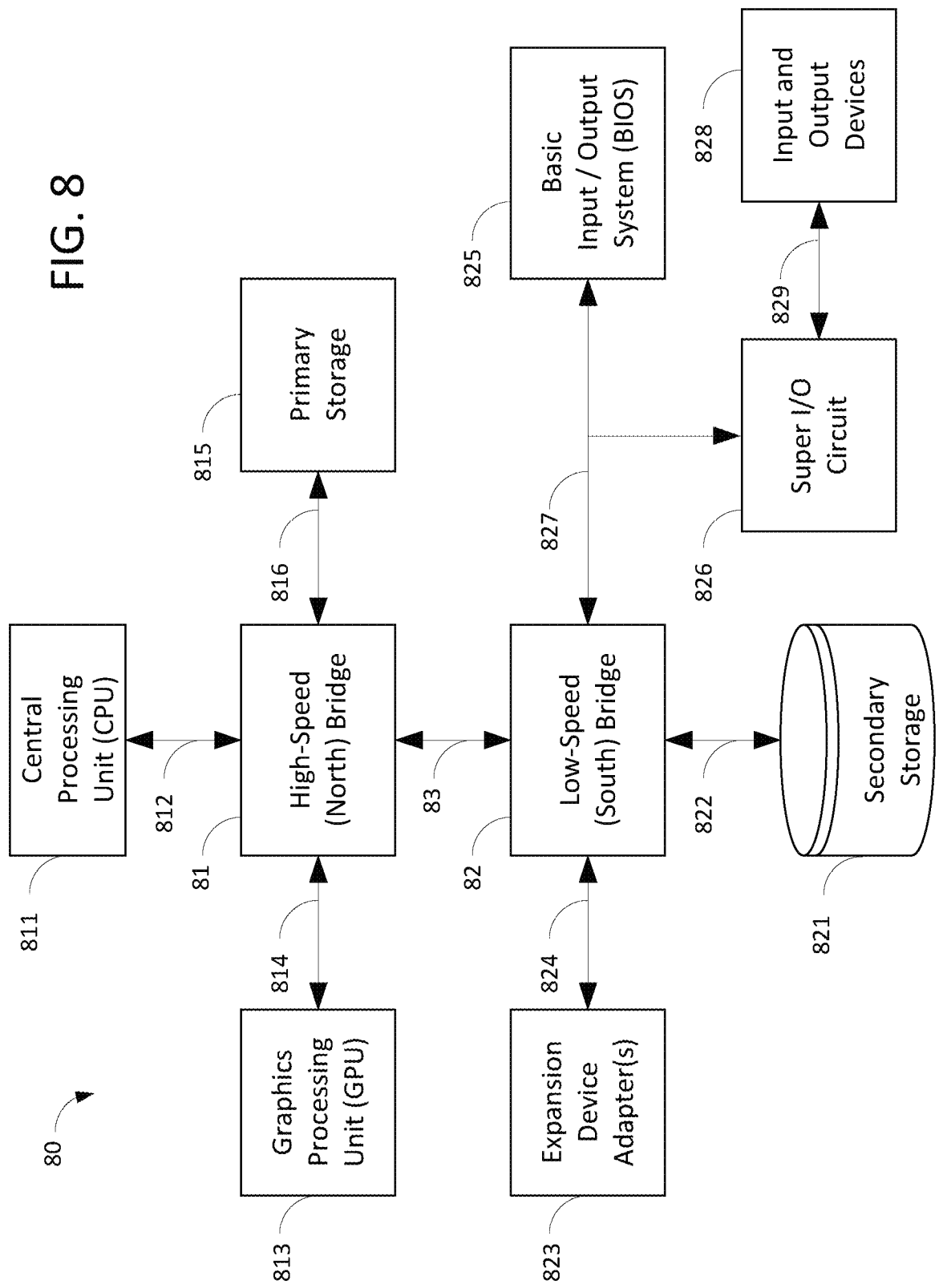
FIG. 8 schematically shows relevant physical components of a computer that may be used to embody the concepts, structures, and techniques disclosed herein.

FIG. 8 schematically shows relevant physical components of a computer 80 that may be used to embody the concepts, structures, and techniques disclosed herein. In particular, the computer 80 may be used, in whole or in part, to implement the system shown in FIG. 2, or the processes shown in FIGS. 3-7. Generally, the computer 80 has many functional components that communicate data with each other using data buses. The functional components of FIG. 8 are physically arranged based on the speed at which each must operate, and the technology used to communicate data using buses at the necessary speeds to permit such operation.

Thus, the computer 80 is arranged as high-speed components and buses 811 to 816 and low-speed components and buses 821 to 829. The high-speed components and buses 811 to 816 are coupled for data communication using a high-speed bridge 81, also called a "northbridge," while the low-speed components and buses 821 to 829 are coupled using a low-speed bridge 82, also called a "southbridge."

The computer 80 includes a central processing unit ("CPU") 811 coupled to the high-speed bridge 81 via a bus 812. The CPU 811 is electronic circuitry that carries out the instructions of a computer program. As is known in the art, the CPU 811 may be implemented as a microprocessor; that is, as an integrated circuit ("IC"; also called a "chip" or "microchip"). In some embodiments, the CPU 811 may be implemented as a microcontroller for embedded applications, or according to other embodiments known in the art.

The bus 812 may be implemented using any technology known in the art for interconnection of CPUs (or more particularly, of microprocessors). For example, the bus 812 may be implemented using the HyperTransport architecture developed initially by AMD, the Intel QuickPath Interconnect ("QPI"), or a similar technology. In some embodiments, the functions of the high-speed bridge 81 may be implemented in whole or in part by the CPU 811, obviating the need for the bus 812.

The computer 80 includes one or more graphics processing units (GPUs) 813 coupled to the high-speed bridge 81 via a graphics bus 814. Each GPU 813 is designed to process commands from the CPU 811 into image data for display on a display screen (not shown). In some embodiments, the CPU 811 performs graphics processing directly, obviating the need for a separate GPU 813 and graphics bus 814. In other embodiments, a GPU 813 is physically embodied as an integrated circuit separate from the CPU 811 and may be physically detachable from the computer 80 if embodied on an expansion card, such as a video card. The GPU 813 may store image data (or other data, if the GPU 813 is used as an auxiliary computing processor) in a graphics buffer.

The graphics bus 814 may be implemented using any technology known in the art for data communication between a CPU and a GPU. For example, the graphics bus 814 may be implemented using the Peripheral Component Interconnect Express ("PCI Express" or "PCIe") standard, or a similar technology.

The computer 80 includes a primary storage 815 coupled to the high-speed bridge 81 via a memory bus 816. The primary storage 815, which may be called "main memory" or simply "memory" herein, includes computer program instructions, data, or both, for use by the CPU 811. The primary storage 815 may include random-access memory ("RAM"). RAM is "volatile" if its data are lost when power is removed, and "non-volatile" if its data are retained without applied power. Typically, volatile RAM is used when the computer 80 is "awake" and executing a program, and when the computer 80 is temporarily "asleep", while non-volatile RAM ("NVRAM") is used when the computer 80 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 816 may be implemented using any technology known in the art for data communication between a CPU and a primary storage. The memory bus 816 may comprise an address bus for electrically indicating a storage address, and a data bus for transmitting program instructions and data to, and receiving them from, the primary storage 815. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 80 may use up to $8*2^{32}=32$ gigabytes (GB) of primary storage 815. In this example, the memory bus 816 will have a total width of 64+32=96 bits. The computer 80 also may include a memory controller circuit (not shown) that converts electrical signals received from the memory bus 816 to electrical signals expected by physical pins in the primary storage 815, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 811, the graphics processing units 813, the primary storage 815, and the high-speed bridge 81, or any combination thereof, as a single integrated circuit. In such embodiments, buses 812, 814, 816 may form part of the same integrated circuit and need not be physically separate. Other designs for the computer 80 may embody the functions of the CPU 811, graphics processing units 813, and the primary storage 815 in different configurations, obviating the need for one or more of the buses 812, 814, 816.

The depiction of the high-speed bridge 81 coupled to the CPU 811, GPU 813, and primary storage 815 is merely exemplary, as other components may be coupled for communication with the high-speed bridge 81. For example, a network interface controller ("NIC" or "network adapter") may be coupled to the high-speed bridge 81, for transmitting and receiving data using a data channel. The NIC may store data to be transmitted to, and received from, the data channel in a network data buffer.

The high-speed bridge 81 is coupled for data communication with the low-speed bridge 82 using an internal data bus 83. Control circuitry (not shown) may be required for transmitting and receiving data at different speeds. The internal data bus 83 may be implemented using the Intel Direct Media Interface ("DMI") or a similar technology.

The computer 80 includes a secondary storage 821 coupled to the low-speed bridge 82 via a storage bus 822. The secondary storage 821, which may be called "auxiliary memory", "auxiliary storage", or "external memory" herein, stores program instructions and data for access at relatively low speeds and over relatively long durations. Since such durations may include removal of power from the computer 80, the secondary storage 821 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 822 may be implemented using any technology known in the art for data communication between a CPU and a secondary storage and may include a host adaptor (not shown) for adapting electrical signals from the low-speed bridge 82 to a format expected by physical pins on the secondary storage 821, and vice versa. For example, the storage bus 822 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 80 also includes one or more expansion device adapters 823 coupled to the low-speed bridge 82 via a respective one or more expansion buses 824. Each expansion device adapter 823 permits the computer 80 to communicate with expansion devices (not shown) that provide additional functionality. Such additional functionality may be provided on a separate, removable expansion card, for example an additional graphics card, network card, host adaptor, or specialized processing card.

Each expansion bus 824 may be implemented using any technology known in the art for data communication between a CPU and an expansion device adapter. For example, the expansion bus 824 may transmit and receive electrical signals using a Peripheral Component Interconnect ("PCI") standard, a data networking standard such as an Ethernet standard, or a similar technology.

The computer 80 includes a basic input/output system ("BIOS") 825 and a Super I/O circuit 826 coupled to the low-speed bridge 82 via a bus 827. The BIOS 825 is a non-volatile memory used to initialize the hardware of the computer 80 during the power-on process. The Super I/O circuit 826 is an integrated circuit that combines input and output ("I/O") interfaces for low-speed input and output devices 828, such as a serial mouse and a keyboard. In some embodiments, BIOS functionality is incorporated in the Super I/O circuit 826 directly, obviating the need for a separate BIOS 825.

The bus 827 may be implemented using any technology known in the art for data communication between a CPU, a BIOS (if present), and a Super I/O circuit. For example, the bus 827 may be implemented using a Low Pin Count ("LPC") bus, an Industry Standard Architecture ("ISA") bus, or similar technology. The Super I/O circuit 826 is coupled to the I/O devices 828 via one or more buses 829. The buses 829 may be serial buses, parallel buses, other buses known in the art, or a combination of these, depending on the type of I/O devices 828 coupled to the computer 80.

The techniques and structures described herein may be implemented in any of a variety of different forms. For example, features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for alerting an individual to unusual activities in an enterprise production environment executing a plurality of instances of an application, the system comprising:

a microprocessor, and a memory coupled to the microprocessor, that together provide:
a natural language processor configured for identifying a sequence of microservices accessed by each of the plurality of instances of the application, using natural language processing;
a classifier configured for classifying the sequence of microservices into a sequence of activities;
a feature vector generator configured for generating feature vectors for each activity in the sequence of activities;
a graph processor configured for creating from the feature vectors a directed graph having nodes and directed edges, each node of the directed graph representing a microservice and each directed edge of the directed graph representing a transition between microservices during an activity;
an instance activity database configured for storing heuristic data records pertaining to the instances; and
an unusual activity detector configured for:
overlaying, on the directed graph, activities executed by a given instance to determine whether the given instance is suspicious, wherein the given instance is determined to be suspicious when both (a) the activities executed by the given instance include a microservice or transition absent from the directed graph, and (b) the microservice or transition is not described in a policy file for the application, and
adding, to the directed graph, a node representing the microservice or an edge representing the transition when the given instance was not determined to be suspicious, and
updating the stored heuristic data record for the given instance in the instance activity database accordingly, and
alerting the individual when the given instance remains suspicious for a given duration of time, as determined from the stored heuristic data record.

2. The system of claim 1, wherein an application instance in the plurality of instances generates a log file, and the natural language processor is configured for identifying the sequence of microservices by using natural language processing on the log file.

3. The system of claim 2, wherein the natural language processor is configured to use natural language processing comprising one or more of: sentence segmentation, tokenization, identifying parts of speech, lemmatization, identifying stop words, identifying noun phrases, and coreference resolution.

4. The system of claim 1, wherein the classifier is configured for classifying the sequence of microservices into the sequence of activities using a generative statistical model.

5. The system of claim 4, wherein the generative statistical model operates according to a latent Dirichlet allocation.

6. The system of claim 1, wherein the feature vector generator is further configured for generating feature vectors including one or more of: a list of microservices visited by all of the activities in the sequence of activities, a list of activities in sequential order, and an average URI hit rate.

7. The system of claim 6, wherein the graph processor is configured for creating the directed graph from the feature vectors by creating one node for each microservice in the list of microservices, and creating the directed edges by tracing each activity in the list of activities over the nodes.

8. The system of claim 1, wherein the instance activity database is configured for storing heuristic data records comprising: a unique application instance identifier, a record last update time, a trace coverage value representing a percentage of both nodes and edges of the directed graph traversed since the record last update time, a suspiciousness time, and a suspiciousness flag.

9. The system of claim 8, wherein the unusual activity detector is configured for:
determining that the given instance is suspicious when either (a) the trace coverage value is less than a first pre-defined threshold, or (b) the given instance has been inactive for a duration greater than a second pre-defined threshold, or both (a) and (b); and
when the given instance is determined to be suspicious, setting the suspiciousness time to a current time and the suspiciousness flag to TRUE in a data record for the given instance.

10. A method of alerting an individual to unusual activities in an enterprise production environment executing a plurality of instances of an application, the method comprising:
identifying a sequence of microservices accessed by each of the plurality of instances of the application, using natural language processing;
classifying the sequence of microservices into a sequence of activities;
generating feature vectors for each activity in the sequence of activities;
creating from the feature vectors a directed graph having nodes and directed edges, each node of the directed graph representing a microservice and each directed edge of the directed graph representing a transition between microservices during an activity;
overlaying, on the directed graph, activities executed by a given instance to determine whether the given instance is suspicious, wherein the given instance is determined to be suspicious when both (a) the activities executed by the given instance include a microservice or transition absent from the directed graph, and (b) the microservice or transition is not described in a policy file for the application;
adding, to the directed graph, a node representing the microservice or an edge representing the transition when the given instance was not determined to be suspicious;
updating stored heuristic data record for the given instance accordingly; and
alerting the individual when the given instance remains suspicious for a given duration of time, as determined from the stored heuristic data record.

11. The method of claim 10, wherein an application instance in the plurality of instances generates a log file, and identifying the sequence of microservices comprises using natural language processing on the log file.

12. The method of claim 11, wherein using natural language processing comprises using one or more of: sentence segmentation, tokenization, identifying parts of speech, lemmatization, identifying stop words, identifying noun phrases, and coreference resolution.

13. The method of claim 10, wherein classifying the sequence of microservices into the sequence of activities comprises using a generative statistical model.

14. The method of claim 13, wherein the generative statistical model operates according to a latent Dirichlet allocation.

15. The method of claim 10, wherein generating the feature vectors includes generating feature vectors including one or more of: a list of microservices visited by all of the activities in the sequence of activities, a list of activities in sequential order, and an average URI hit rate.

16. The method of claim 15, wherein creating the directed graph from the feature vectors comprises creating one node for each microservice in the list of microservices, and creating the directed edges by tracing each activity in the list of activities over the nodes.

17. The method of claim 11, wherein the stored heuristic data records comprise: a unique application instance identifier, a record last update time, a trace coverage value representing a percentage of both nodes and edges of the directed graph traversed since the record last update time, a suspiciousness time, and a suspiciousness flag.

18. The method of claim 17, wherein determining that the given instance is suspicious comprises determining that either (a) the trace coverage value is less than a first pre-defined threshold, or (b) the given instance has been inactive for a duration greater than a second pre-defined threshold, or both (a) and (b), the method further comprising, when the given instance is determined to be suspicious, setting the suspiciousness time to a current time and the suspiciousness flag to TRUE in the data record for the given instance.

* * * * *